Aug. 2, 1960 M. P. SCHNEIDER ET AL 2,947,493
SPOOL ARRANGEMENT
Filed May 5, 1958
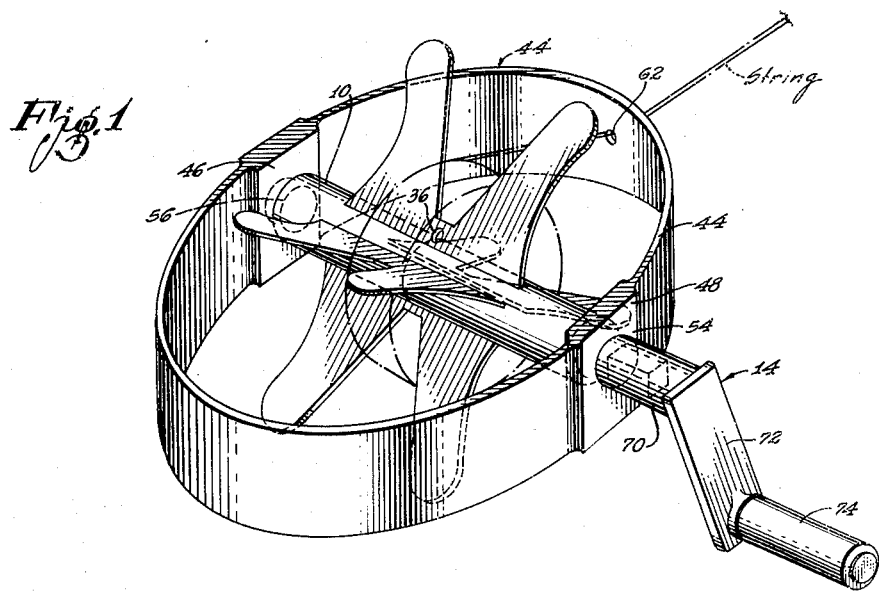
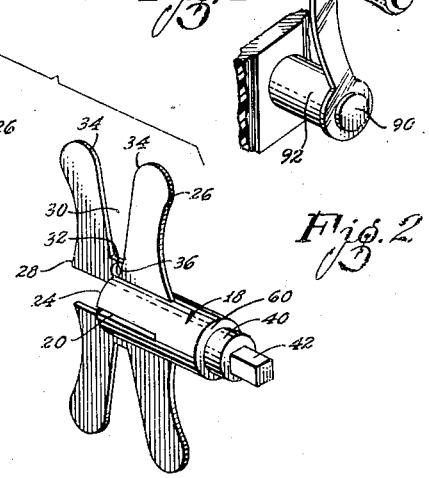
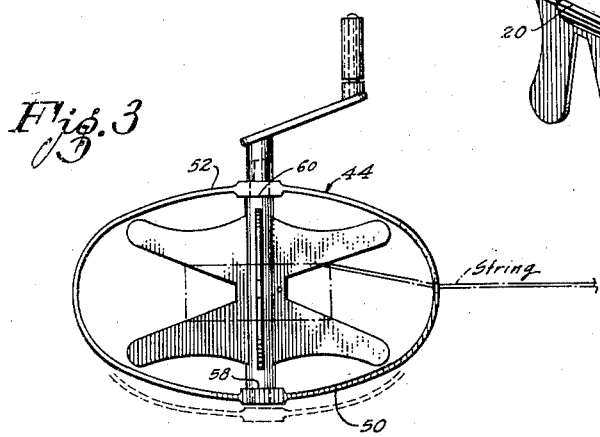
INVENTORS:
Fred W. Klayer
Mark P. Schneider
Attorneys United States Patent Office 2,947,493
Patented Aug. 2, 1960

2,947,493

SPOOL ARRANGEMENT

Mark P. Schneider, 4445 Yellowstone St., Los Angeles, and Fred W. Klayer, 500 South Fifth St., Alhambra, Calif.

Filed May 5, 1958, Ser. No. 732,931

6 Claims. (Cl. 242—96)

This invention relates to a spool arrangement for holding string without snarling as the string becomes wound or unwound from the spool. More particularly, the invention relates to a spool arrangement which can be easily fabricated and assembled and which can be used to facilitate the flying of kites.

There has long existed a need for a spool winding device which is light in weight, which may be fabricated at a minimum of expense and which can be easily assembled. A device of this nature has particular utility in winding and unwinding the string by which kites are flown. Further, such a device may be used in fishing or in any other situation where line is to be payed out or rewound upon a spool.

While many types of reels have been devised for use in fishing, these reels generally have been fabricated of metal parts, and are relatively heavy in weight and quite expensive. Furthermore, they are not easily fabricated and easily assembled. In the sport of kite flying, attention has been given to devising an inexpensive but efficient reel in which the line can be payed out or reeled in without snarling the line regardless of the speed at which the line is being wound or unwound. In spite of such attention, a suitable spool arrangement has not heretofore been devised.

This invention provides a spool arrangement which overcomes the above disadvantages. The spool arrangement is especially adapted for use with kites but may also be used for other purposes such as a fishing reel. In one embodiment of the invention, a pair of shaft segments are provided which, when abutted endwise and disposed coaxially, form a continuous shaft. Each of these segments is provided with slots which extend axially for a particular distance and which have a quadrant spacing around the periphery of the shaft segments. The disposition of the slotting on the two shaft segments is such that, when the ends thereof are abutted, the slotting on one shaft will register with the slotting on the other shaft segment thereby providing a continuous slot extending from one shaft segment into the other.

Each shaft segment supports a pair of blades in a pair of oppositely disposed slots. These blades overhang the shaft segment on which they are mounted so as to slide into the slots on the other shaft segment when the two segments are moved toward each other to form one unit in an interlocking relationship. Notches are formed in each blade to receive string as from a kite. The interlocking unit formed by the shaft segments and the blades is supported within a ring which is preferably provided with an elliptical configuration. By providing the support ring with an elliptical configuration, the support ring can be easily bowed along its minor axis to provide for the introduction of the shaft segments and the blades into the support ring or the removal of these members from the support ring.

The details of the invention are set forth hereinafter in reference to the accompanying drawings in which:

Figure 1 is a perspective view of a spool unit constituting a preferred embodiment of the invention;

Figure 2 is an exploded perspective view of certain elements shown in Figure 1 as seen from a position corresponding to that shown in Figure 1 and includes a showing of shaft segments and blades supported by the segment; and Figure 3 is a plan view of the assembly shown in Figure 1 and shows one positioning of a support member for the spool arrangement in solid lines and further shows a second positioning of the support member in broken lines, this second positioning being provided to facilitate attachment of the spool arrangement to the support member or removal of the spool arrangement from the support member; and Figure 4 is a fragmentary perspective view of a modified handle which can be used in the embodiment shown in Figure 3.

Referring first to Figure 1, it may be seen that the complete unit includes a spool assembly, designated generally by the numeral 10, which is journaled to rotate within an elliptical ring or housing 44. It will also be seen that a crank member 14 is coupled to the spool assembly 10 to provide a rotation of the spool assembly in accordance with rotary movements of the crank member.

The spool assembly 10, as may be seen from Figure 2, includes two shaft segments 16 and 18 which may be molded from a rigid plastic material or from any other suitable type of material and which may be fabricated in any other manner than molding. Each of the shaft segments 16 and 18 is preferably provided with an annular periphery and is axially slotted at 20. The slots 20 are preferably disposed in quadrant relationship on each of the shaft segments 16 and 18. These slots extend from the end 22 of the shaft segment 16 and from the end 24 of the shaft segment 18 for a distance equal to approximately one half of the axial lengths of the segments.

A pair of flat bifurcated blades 26 are constructed to be push fitted into a pair of the diametrically disposed slots 20 in the shaft segment 16, and a pair of flat bifurcated blades 26 are constructed to be push fitted into a pair of the diametrically disposed slots 20 in the shaft segment 18. The blades 26 are provided with lengths corresponding substantially to the lengths of the shaft segments 16 and 18 and are disposed so as to be push fitted into the slots 20 along only approximately one half of their lengths. The blades 26 may be secured within the slots 20 as by a suitable cement applied to the slots. The blades 26 may be formed in a manner and from a material similar to the shaft segments 16 and 18.

Each blade is preferably similar in configuration and is cut centrally to provide a notch 30. The notch 30 is preferably V-shaped although the trough 32 of the notch is preferably blunted, as shown in the drawings. The corners 34 of the blades are preferably rounded so as not to catch or abrade the string or cord which is intended to be wound upon the reel. One of the blades may be provided with a hole 36 at a position near the trough 34. By providing the hole 36, a string can be inserted through the hole and knotted so as to become secured to the spool assembly 10.

The spool assembly 10 is assembled by sliding the diametrically disposed blades 26 on each of the shaft segments 16 and 18 into the unfilled diametrically disposed slots on the other shaft segment. The two shaft segments 16 and 18 are then pushed toward each other in an axial direction until the blades on each shaft segment are firmly fitted into the slots 20 on the other shaft segment and until the two ends 22 and 24 of the shaft segments 16 and 18 are respectively brought into close abutment. After the blades on each shaft have been inserted in the slots and the ends of the shaft segments have been brought into abutment, a suitable plastic cement may be applied to the joined parts to secure these parts together permanently.

At the ends opposite the abutting ends, the shaft segments 16 and 18 are respectively provided with annular portions 38 and 40 which are provided with a reduced diameter so as to be easily journalled into a supporting structure. The shaft segment 18 is further provided with a tongue portion 42 having a rectangular configuration in cross section to receive the crank member 14. The crank member 14 includes a sleeve 70 having a groove to receive the tongue portion 44 and also includes a lever arm 72 disposed in transverse relationship to the sleeve. A handle 74 extends outwardly from the lever arm 72 in substantially parallel relationship to the sleeve 70.

The spool unit 10 is mounted for rotation in a resilient support ring 44, which is preferably elliptical in configuration. The ring 44 is provided with a minor axis having a length slightly less than the distance between the reduced portions 38 and 40 on the shaft segments 16 and 18, respectively, when the two segments are brought together and secured in the manner described above to form a continuous single shaft. The support ring 44 may be molded or otherwise formed to have a pair of laterally reinforced portions 46 and 48 where the minor axis intersects the ring. The reinforced portions 46 and 48 are provided with sockets to receive the reduced portions 38 and 40 of the shaft segments 16 and 18. A hole 62 is provided in the support ring 44 at a position corresponding to the major axis of the support ring 44.

Because of the resiliency of the member 44, the side wall 50 may be pulled away from the opposite wall to the position shown in dotted lines in Figure 3. This action is further enhanced because of the elliptical configuration provided for the ring 44 and because of the bracing provided by the major axis of the elliptical ring. This will enable the shaft unit to be inserted first in the orifice 54 in the reinforced portion 48 and then in the orifice 56 in the reinforced portion 46. The wall 50 is then released so as to spring back to provide a support of the shaft unit including the two segments 16 and 18. The crank member 14 is then inserted on the tongue portion 42 which extends through the socket in the reinforced portion 48. By providing the minor axis of the support ring 44 with a sufficient length relative to the length of the major axis of the ring, the thrust upon the shoulders 58 and 60 of the shaft segments 16 and 18 becomes minimized when the ring is bowed from the configuration shown in full lines in Figure 3 to the configuration shown in broken lines.

In use, one end of the string is passed through the hole 62 and then through the hole 36 and is knotted to prevent it from passing back out through the hole 36. The string may then be wound in the notch 30 by simple cranking action. Whenever it is desired to use the spool unit 10 to pay out quickly a long length of string, the crank member 14 is preferably pulled off the tongue portion 42 and the sides of the support ring 44 are simply held in the operator's hands. By properly constructing the spool unit 10 and the support ring 44 and by providing a proper ratio between the major and minor axes of the support ring 44, there is little axial thrust bearing between the shoulders 58 and 60 and the reinforced portions 46 and 48 respectively. Furthermore, the openings 56 and 54 provide adequate clearance for the portions 38 and 40 of the shaft segments 16 and 18 respectively. The spool unit 10 will be found to turn at very high speed with a minimum pull exerted on the string. This feature is particularly advantageous when the string is attached to a light kite, and it is desired to pay out a long length of such string quickly and with little string tension.

Figure 4 illustrates a modified handle assembly which can be used in place of the handle assembly shown in Figures 1 and 3. The handle assembly shown in Figure 4 can be similar to handle assemblies now used in such apparatus as fishing reels. The handle assembly shown in Figure 4 includes a pin 90 which is fixedly attached to the support ring 44. A sleeve 92 is rotatably mounted on the pin 90 and is mechanically coupled to the shaft segment 18 to produce a rotary movement of the shaft segments 16 and 18 as a handle 94 is rotated.

It will readily occur to those skilled in the art that other embodiments of this invention may be made without departing from the principles herein taught. Further, the splined shaft and blade unit construction will have other applications than in the fabrication of cord reels. All these are intended to be comprehended within the scope of this invention.

We claim:

1. A spool arrangement for winding and unwinding the string of a kite, including a pair of shaft segments each provided with a plurality of slots extending longitudinally along the shaft segments and disposed at spaced intervals around the periphery of the shaft segments, a plurality of blades each disposed in a particular one of the slots in the shaft segments and each extending longitudinally beyond the slots in the particular shaft segment to slide into one of the slots in the other shaft segment when the segments are combined to form an interlocking relationship, the blades being formed to hold the kite string in wound relationship, and a support ring constructed to become deformed upon the application of pressure to provide for an insertion of the interlocking shaft segments into the support ring for support by the ring and to provide for a removal of the interlocking shaft segments from the support ring.

2. A spool arrangement for winding and unwinding the string of a kite, including, a pair of shaft segments each provided with a plurality of longitudinally extending slots disposed at spaced intervals around the periphery of the shaft segments, a plurality of blades each supported within a different one of the slots in a particular one of the shaft segments and each extending longitudinally beyond the shaft segments for a particular distance to provide for a sliding of the blades into the slots in the other shaft segment for an interlocking relationship of the shaft segments when the shaft segments are moved toward each other, the blades being notched to hold the kite string in wound relationship on the blades, and a support ring provided with a construction and a configuration to provide for a bowing of the support ring upon an insertion of the interlocking shaft segments into the ring for support by the ring and upon a removal of the shaft segments from the ring, there being holes in at least one of the blades and in the support ring to provide for an insertion of the string through the holes for a coupling of the string to the blades.

3. A spool arrangement for winding and unwinding the string of a kite, including, a pair of shaft segments each provided with an annular configuration and each having a plurality of slots disposed in quadrant relationship around the annular periphery and extending in an axial direction, first and second pairs of blades each blade having a flat configuration and each pair of blades being disposed in a diametrically disposed pair of the slots in a particular one of the shaft segments and each blade extending axially beyond the end of the particular shaft segments to slide along the slots in the other shaft segment when the shaft segments are coupled in an interlocking relationship, the blades being notched to hold the kite string in wound relationship, an elliptical support ring, having major and minor axes and constructed to become bowed outwardly at the minor axis upon the exertion of pressure to receive the interlocking shaft segments for a support of the shaft segments upon a release of the pressure or to provide a removal of the shaft segments from the support ring, there being holes in at least one of the blades and in the support ring at a position near the major axis to provide for a passage of the kite string through the spool arrangement for coupling to the blades.

4. The spool arrangement set forth in claim 3 in which the support ring is reinforced at positions where the minor axis intersects the support ring and is provided with sockets to receive the interlocking shaft segments, and in which a crank member is attached to the interlocking shaft segments to facilitate a rotary movement of the shaft segments and the blades for a winding or unwinding of the string from the spool arrangement.

5. A spool arrangement for winding and unwinding the string of a kite, including, a pair of shaft segments, each provided with a plurality of slots extending longitudinally along the shaft segments and disposed at spaced intervals around the periphery of the shaft segments, a plurality of blades each disposed in a particular one of the slots in the shaft segments and extending longitudinally beyond the slots in the particular shaft segment to slide into one of the slots in the other shaft segment, hence segments are combined to form an interlocking relationship, the blades being notched to receive the kite string, an elliptical support ring having major and minor axes and provided with sockets at the positions where the minor axis intersects the ring to receive the shaft and constructed to provide a bowing outwardly of the ring at the minor axis upon the exertion of pressure against the ring to facilitate the insertion of the shaft into the sockets and the removal of the shaft from the sockets, there being holes in a particular one of the blades and in the support ring at the position of the major axis for an insertion of the kite string through the holes to provide an attachment of the string to the particular blade for a winding or unwinding of the kite string on the blades in accordance with the rotation of the shaft.

6. A spool arrangement for winding and unwinding a string including a pair of shaft segments each provided with a plurality of slots extending longitudinally along the shaft segments and disposed at spaced intervals around the periphery of the shaft segments, a plurality of blades each disposed in a particular one of the slots in the shaft segments and each extending longitudinally beyond the slots in the particular shaft segment to slide into one of the slots in the other shaft segment when the segments are combined to form an interlocking relationship, the blades being formed to hold the string in wound relationship, and means for rotatably supporting the combined shaft segments so as to provide for readily winding and unwinding the string.

References Cited in the file of this patent
UNITED STATES PATENTS
1,840,214    Shaw _____ Jan. 5, 1932